United States Patent
Park

[11] Patent Number: 6,061,178
[45] Date of Patent: May 9, 2000

[54] SCREEN OF PROJECTOR

[75] Inventor: Jong-bae Park, Suwon, Rep. of Korea

[73] Assignee: Samsung Electronics Co., Ltd., Kyungki-do, Rep. of Korea

[21] Appl. No.: 09/178,478

[22] Filed: Oct. 26, 1998

[30] Foreign Application Priority Data

Dec. 16, 1997 [KR] Rep. of Korea ........................ 97-69179

[51] Int. Cl.[7] .......................... G03B 21/60; G03B 21/56; G02B 27/10
[52] U.S. Cl. .......................... 359/457; 359/443; 359/455; 359/619
[58] Field of Search ................................... 359/619, 454, 359/455, 456, 457, 443, 460

[56] References Cited

U.S. PATENT DOCUMENTS

| | | | |
|---|---|---|---|
| 3,832,032 | 8/1974 | Shimada | 359/457 |
| 4,525,029 | 6/1985 | Inoue et al. | 359/457 |
| 4,979,801 | 12/1990 | Park | 359/457 |
| 5,296,922 | 3/1994 | Mitani et al. | 359/457 |
| 5,513,037 | 4/1996 | Yoshida et al. | 359/457 |
| 5,581,407 | 12/1996 | Mitani et al. | 359/457 |
| 5,724,182 | 3/1998 | Mitani et al. | 359/457 |
| 5,745,288 | 4/1998 | Miyata et al. | 359/457 |

*Primary Examiner*—Georgia Epps
*Assistant Examiner*—Suzanne Letendre
*Attorney, Agent, or Firm*—Sughrue, Mion, Zinn, Macpeak & Seas, PLLC

[57] ABSTRACT

A projector screen is provided with a Fresnel lens for collimating lights projected from a projection lens provided in a projection device. A lenticular lens having a plurality of pillar lens elements successively arranged in parallel forms an image from the collimated lights projected by the Fresnel lens and spreads the image. A protection panel is installed on the front surface of the lenticular lens for protecting the lenticular lens. Also, a plurality of parallel spreading units is formed along the central axis of each lens element at the contact portion of the lenticular lens and the protection panel for providing a wide viewing angle of the image. The surface of the lenticular lens opposing the protection panel is flat so as to adhere to the protection panel.

6 Claims, 3 Drawing Sheets

SCREEN OF PROJECTOR

BACKGROUND OF THE INVENTION

1. Field of the Invention

The present invention relates to a projector screen for an image display, and more particularly, to a projector screen having an improved structure allowing a wider horizontal viewing angle.

2. Description of the Related Art

An image projection system, such as a projection television or a video projector, generates an image using an image formation medium, such as a small cathode ray tube (CRT), a liquid crystal display (LCD) or a polymer dispersion LCD (PDLCD), and magnifies and projects the image onto a large screen using a projection lens.

The image projection system is in great demand since it meets the demands of consumers who prefer a large screen.

In the operation of an image projection system, an image is projected from an image source to a screen, and the projected image is viewed by a viewer in front of the screen. When there are a large number of viewers, they must be positioned in many positions in front of the screen, and therefore, the image must be projected to have a wide viewing angle so that the image can be viewed from many different positions.

Referring to FIG. 1 showing a conventional projector screen, the screen includes a Fresnel lens 11 for collimating a divergent light emitted from a projection lens (not shown) of a projecting device, to display an image having a wide viewing angle and uniform luminance. A lenticular lens 12 functions as a light spreader for spreading a collimated light from the Fresnel lens 11 and forming an image is installed in front of the Fresnel lens 11. The lenticular lens 12 includes a plurality of cylindrical lens elements 13 that are arranged parallel and adjacent to each other.

A protrusion 14 for preventing interference between lights diverged by convex surfaces 13a of the adjacent lens elements 13 is formed to a predetermined height on the joint portion of the lens elements 13 in the front portion of the lenticular lens 12. A black stripe 14a coated with black ink is formed on the front surface of the protrusion 14, so that the contrast of an image is improved.

A screen protection panel (not shown) made of an acrylic resin is installed in front of the lenticular lens 12.

In the above-described conventional projector screen, since the protrusion 14 protrudes forward more than the convex surfaces 13a of the lens elements 13, the angle by which light is spread is limited by the protrusion 14 as shown in FIG. 2. Therefore, a horizontal view angle with respect to an image on a screen is also limited.

SUMMARY OF THE INVENTION

To solve the above problems, it is an objective of the present invention to provide a projector screen having an improved structure to increase the horizontal viewing angle.

Accordingly, to achieve the above objective, a projector screen comprises a Fresnel lens for collimating lights projected from a projection device and a lenticular lens installed in front of the Fresnel lens for spreading the collimated lights from the Fresnel lens for forming an image, and consisting of an array of a plurality of lens elements whose rear surfaces facing the Fresnel lens are formed of convex portions and whose front surfaces are flat. A protection panel is attached to the front surface of the lenticular lens for protecting the lenticular lens. Also, a spreading unit is formed at a contact portion of the lenticular lens and the protection panel at the center of each lens element in the axial direction of the lens element, for spreading incident light.

The spreading unit comprises an injection hole formed on a contact portion of the lenticular lens and the protection panel in the axial direction of the lens element; and a spreading material injected into the injection hole.

Also, it is preferable that a black stripe is formed in the contact portion of between the lenticular lens and the protection panel between the spreading units.

According to another aspect of the present invention, a projector screen comprises a Fresnel lens for collimating lights projected from a projection device and a lenticular lens installed in front of the Fresnel lens for spreading the collimated lights from the Fresnel lens for forming an image, and consisting of an array of a plurality of lens elements whose rear surfaces facing the Fresnel lens are formed of convex portions and whose front surfaces are flat. Also, a protection panel attached to the front surface of the lenticular lens is provided for protecting the lenticular lens. A spreading rod is installed on a contact portion of the lenticular lens and the protection panel at the center of each lens element in the axial direction of the lens element, for spreading incident light.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
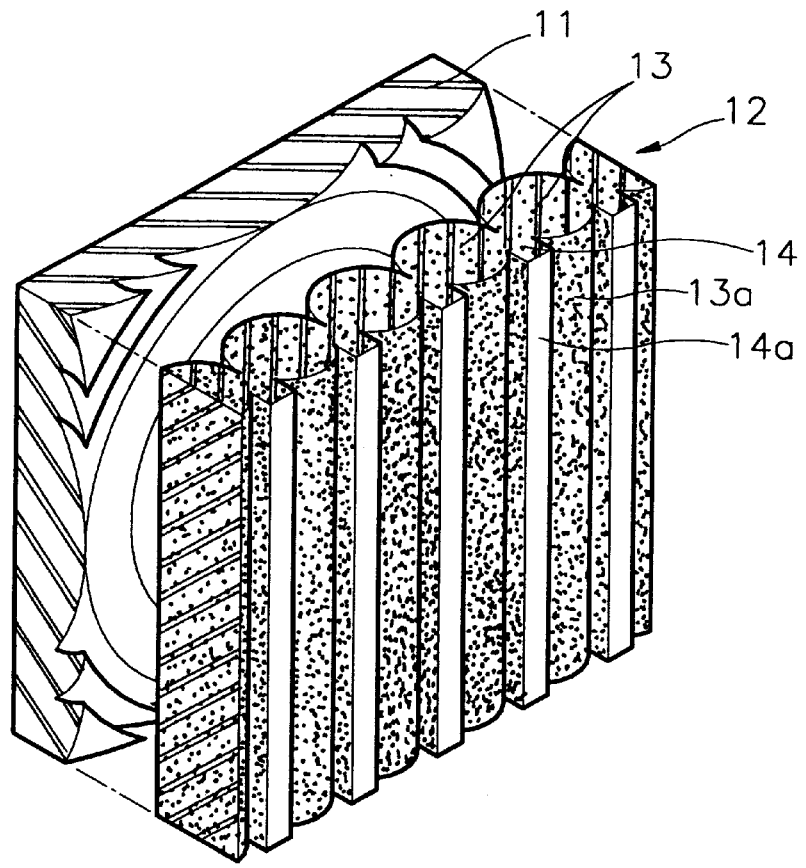
FIG. 1 is a perspective view illustrating a conventional projector screen.
Figure 2:
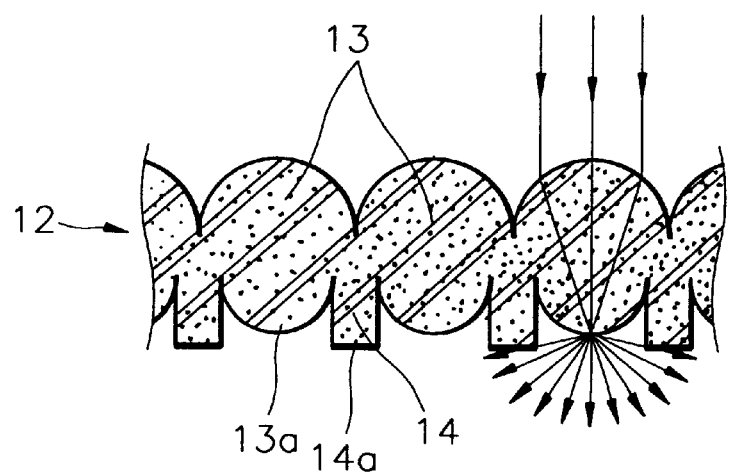
FIG. 2 is a partial plan view illustrating a lenticular lens of FIG. 1.
Figure 3:
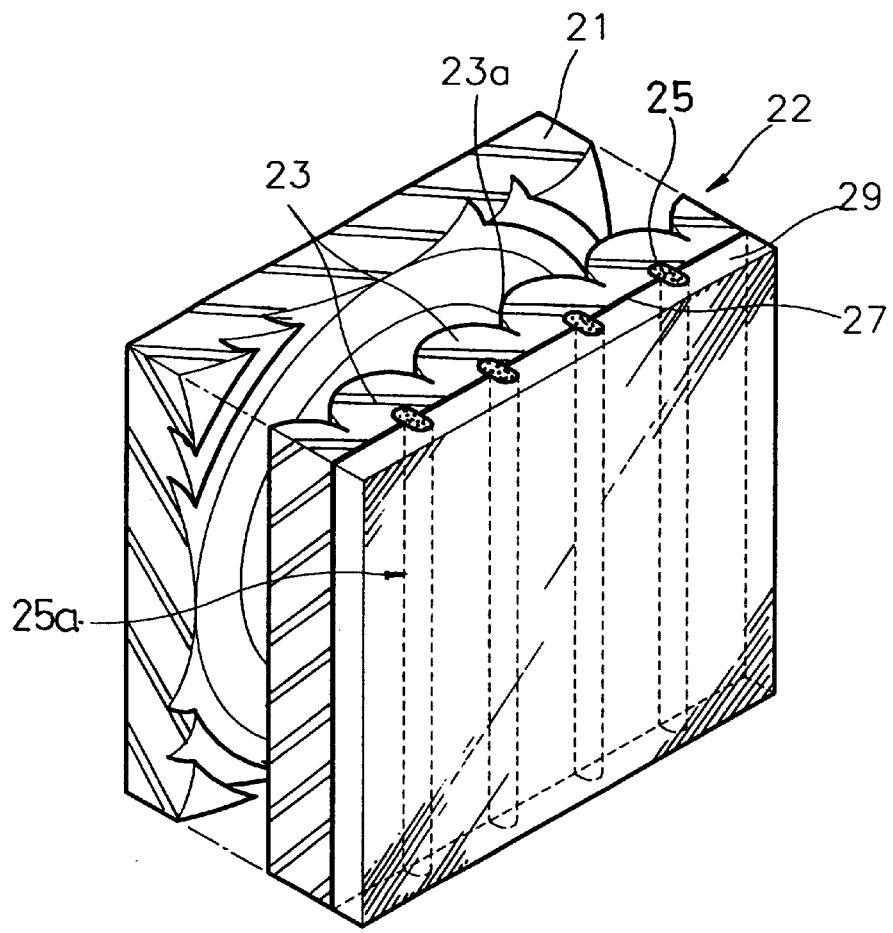
FIG. 3 is a perspective view illustrating a projector screen according to an embodiment of the present invention.

Referring to FIG. 3, a projector screen according to an embodiment of the present invention includes a Fresnel lens 21 for collimating an incident light, a lenticular lens 22 installed in front of the Fresnel lens 21, and a protection panel 29 installed at the front surface of the lenticular lens 22 to protect the lenticular lens 22.

The Fresnel lens 21 collimates a light magnified and projected by a projection lens (not shown) installed in a projection device (not shown).

The lenticular lens 22 spreads the collimated light emitted from the Fresnel lens 21 and forms an image. The lenticular lens 22 includes a plurality of cylindrical lens elements 23 which are connected parallel to each other.

Each of the lens elements 23 has a plano-convex section. In other words, the rear surfaces of the lens elements 23 facing the Fresnel lens 21 are formed of convex portions 23a, and the front surfaces of the lens elements 23 are flat so that the protection panel 29 is attached thereto.

The protection panel 29 for protecting the lenticular lens 22 is made of an acrylic resin, or the like.

Also, spreading units 25 for spreading an incident light are installed on a contact portion between the protection panel 29 and the lenticular lens 22 at the center of each of the lens elements 23. The spreading units 25 are aligned at equal intervals in the axial direction of the lens element 23.

Figure 4:
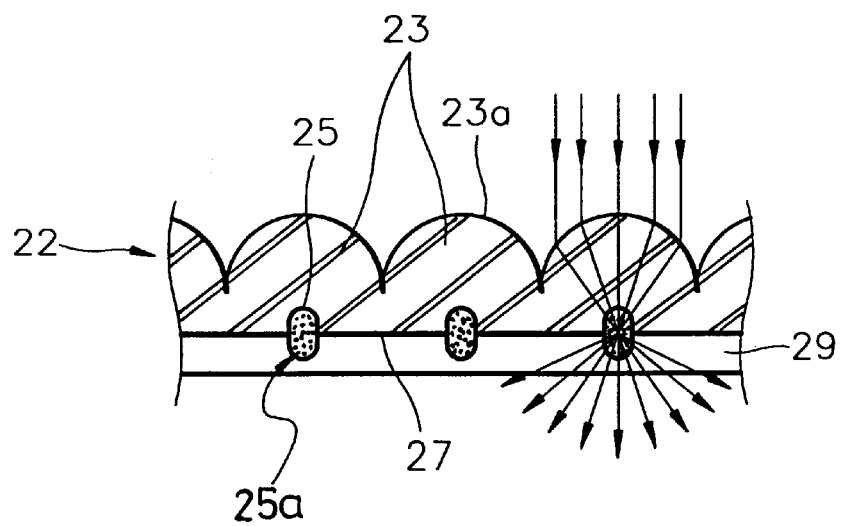
FIG. 4 is a partial plan view illustrating a lenticular lens and a protection panel of FIG. 3.

The spreading unit 25 is formed by injecting a (spreading material 25b) of liquid or gel state into an injection hole 25a and sealing the injection hole 25a. The injection hole 25a is formed at the contact portion between the lenticular lens 22 and the protection panel 29 in the axial direction of the lens element 23, as shown in FIGS. 3 and 4.

It is preferable that a black stripe 27 is formed by coloring the contact surface of the lenticular lens 22 and the protection panel 29 between the spreading units 25 with a black ink.

The thus-formed black stripe 27 increases contrast of an image by preventing an incident light from being reflected by the contact surface of the lenticular lens 22 and the protection panel 29 excluding the spreading unit 25. The black stripe 27 may be formed by coating a mixture of an ink and an adhesive for bonding the lenticular lens 22 and the protection panel 29.

In the operation of the projector screen according to the present invention having such a structure, light magnified and projected by a projection lens (not shown) in a projection device is collimated by the Fresnel lens 21, and the collimated light is spread by the spreading unit 25 installed between the lenticular lens 22 and the protection panel 29. To be more specific, the parallel light incident from the Fresnel lens 21 is focused in the convex portion 23a of the lens element 23, and the focused light is spread by the spreading unit 25. The spreading unit 25 acts as a pillar lens to spread the incident light, so that the light spreading angle is remarkably increased.

Figure 5:
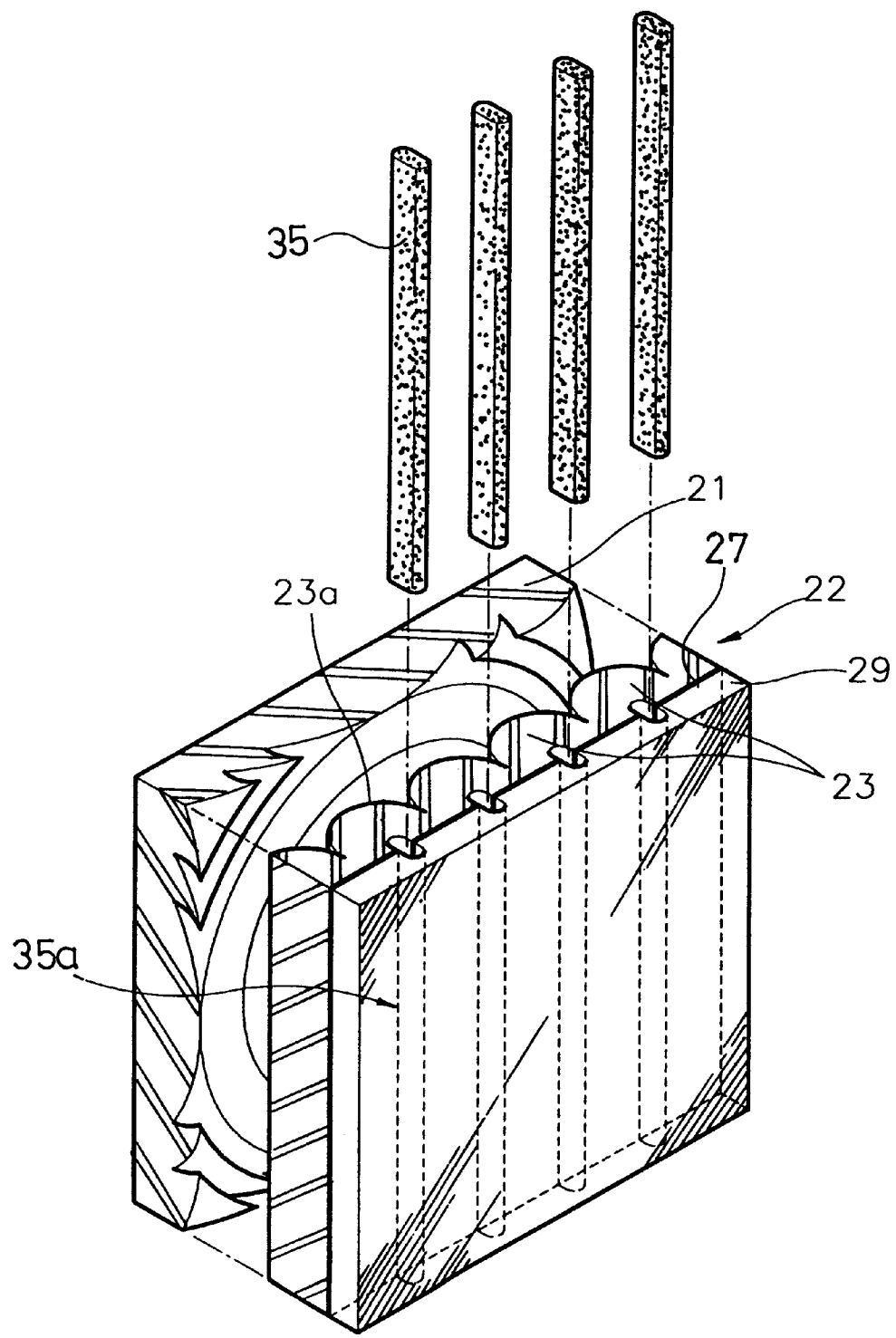
FIG. 5 is a perspective view illustrating a projector screen according to another embodiment of the present invention.

FIG. 5 shows a projector screen according to another embodiment of the present invention. Like reference numerals as those in FIG. 3 denote the same members.

In this embodiment, insertion holes 35a are formed at the contact portion of the lenticular lens 22 and the protection panel 29 at the middle of the lens elements 23, and spread rods 35 for spreading an incident light are inserted into the insertion holes 35a.

The spread rods 35, being inserted into the insertion holes 35a, spread the incident light. The spread rod 35 can be an optical fiber or an acrylic rod. Also, the spread rods 35 act as pillar lenses to spread incident light.

According to the projector screen of the present invention, the lenticular lens and the protection panel adhere to each other, and a plurality of pillar spreading units are provided between the lenticular lens and the protection panel, thereby increasing the light spread angle. Therefore, a wider horizontal viewing angle can be obtained.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A projector screen comprising:

a Fresnel lens for collimating light projected from a projection device;

a lenticular lens installed in front of said Fresnel lens for spreading the collimated light from said Fresnel lens for forming an image, and consisting of an array of lens elements having rear surfaces which face said Fresnel lens being formed of convex portions and having front surfaces which are flat;

a protection panel attached to the front surface of said lenticular lens for protecting said lenticular lens; and a spreading unit formed on a contact portion of said lenticular lens and said protection panel at the center of each of said lens elements in the axial direction of the lens element, which spreads incident light.

2. The projector screen as claimed in claim 1, wherein the spreading unit comprises:

an injection hole formed on said contact portion of said lenticular lens and said protection panel in the axial direction of the lens element; and a spreading material injected into said injection hole.

3. The projector screen as claimed in claim 1, further comprising a black stripe formed in said contact portion of said lenticular lens and said protection panel between said spreading units.

4. A projector screen comprising:

a Fresnel lens for collimating light projected from a projection device;

a lenticular lens installed in front of said Fresnel lens s for spreading the collimated light from said Fresnel lens for forming an image, consisting of a plurality of lens elements having rear and front surfaces, the rear surfaces facing said Fresnel lens being formed of convex portions and the front surfaces being flat;

a protection panel attached to the front surface of said lenticular lens for protecting said lenticular lens; and a spreading rod installed on a contact portion of said lenticular lens and said protection panel at the center of each of said plurality of lens elements in the axial direction of the lens element, which spreads incident light.

5. The projector screen as claimed in claim 4, wherein insertion holes are formed on the contact portion of said lenticular lens and said protection panel in the axial direction of the lens element to receive said spreading rods.

6. The projector screen as claimed in claim 4, further comprising a black stripe formed on the contact surface of said lenticular lens and said protection panel between said spreading rods.

* * * * *